United States Patent
Huang

[11] Patent Number: 6,154,435
[45] Date of Patent: Nov. 28, 2000

[54] HEIGHT ADJUSTING DEVICE FOR A TONE ARM

[75] Inventor: J. Y. Huang, Tainan Hsien, Taiwan

[73] Assignee: Ya Horng Electronic Co., Ltd., Tainan, Taiwan

[21] Appl. No.: 09/203,809

[22] Filed: Dec. 1, 1998

[51] Int. Cl.[7] ............................................. G11B 17/04
[52] U.S. Cl. ...................................................... 369/181
[58] Field of Search ................................... 369/181, 182, 369/184, 178, 192, 215; 360/98.01, 97.03

[56] References Cited

U.S. PATENT DOCUMENTS

| 4,170,360 | 10/1979 | Ohsawa ........................... 369/181 |
| 5,226,032 | 7/1993 | Ikedo et al. .................... 369/181 |

*Primary Examiner*—Allen T. Cao
*Attorney, Agent, or Firm*—Pro-Techtor International Services

[57] ABSTRACT

A height adjusting device for a tone arm includes a stationary outer annular base, an inner annular base fitted rotatably but not moving up or down in the outer annular base, and a seat having the bottom fitted in the inner annular base and a tone arm fixed on the seat. The inner annular base has some sloped slots in the vertical wall. The sloped slots slopes in the same direction. The seat has projections on the vertical wall to fit and move in the sloped slots of the inner annular base. Then the inner annular base is manually rotated by a connector protruding out of a long slot of the outer annular base, causing said seat with the tone arm moved up or down by the projections moving back or forth in the sloped slots.

6 Claims, 8 Drawing Sheets

HEIGHT ADJUSTING DEVICE FOR A TONE ARM

BACKGROUND OF THE INVENTION

This invention relates to a height adjusting device for a tone arm of a record player, particularly to one easy to handle in adjusting the height of a tone arm and simple to produce.

In using traditional record players, a cartridge fixed at a front end of a tone arm reads information stored in annular shallow grooves on the surface of a record. Different cartridges have different thickness, and if a cartridge is too thin, it cannot reach the surface of a record to pick up music, but if the cartridge is too thick, it has to reach the surface of a record in an inclined condition, impossible to pick up the music precisely. So most conventional record players are provided with a height adjusting device to adjust the height of the cartridge to suit to different thickness of cartridges.

Figure 1:
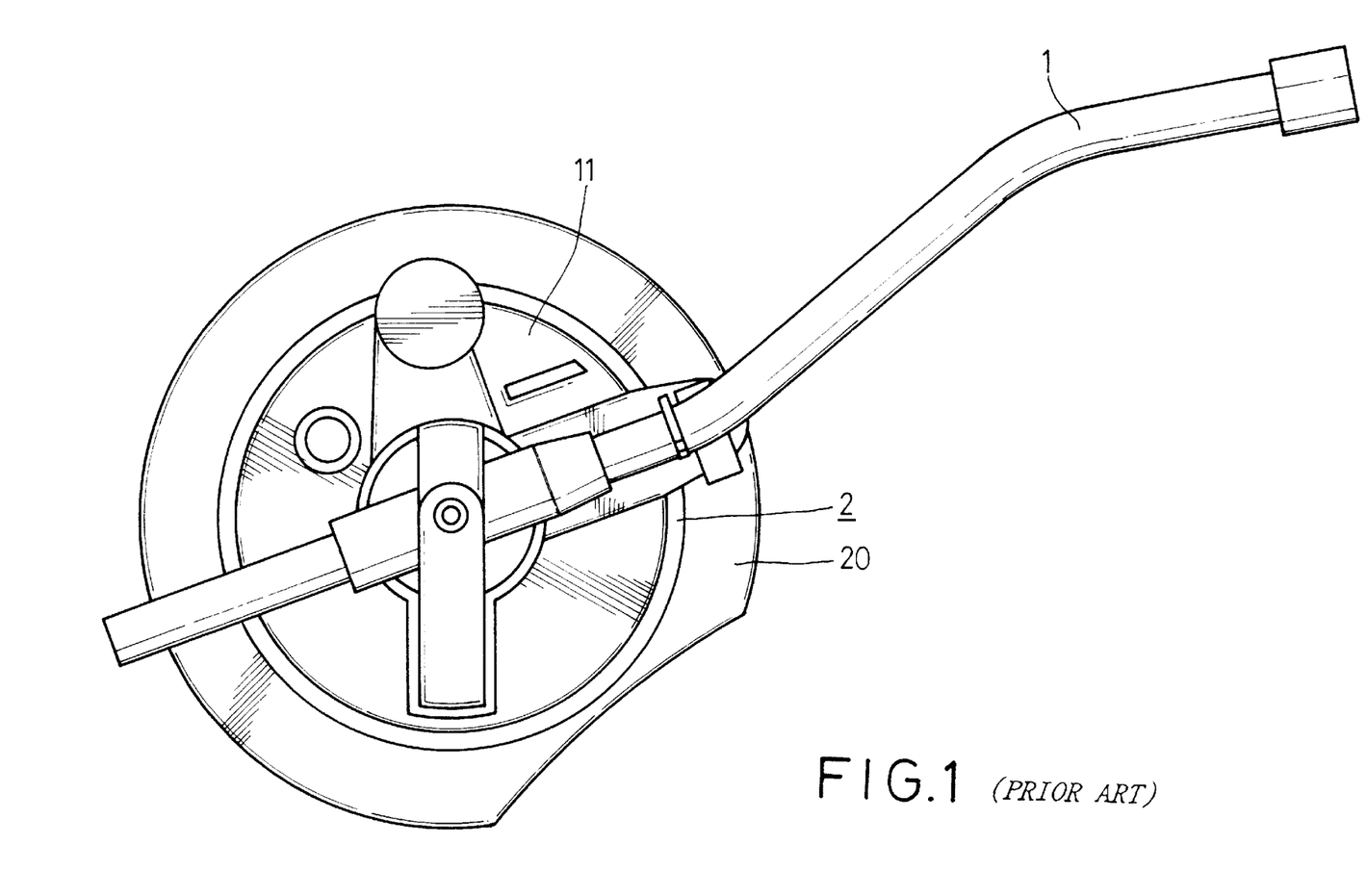
FIG. 1 is an upper view of a conventional height adjusting device for a tone arm.
Figure 2:
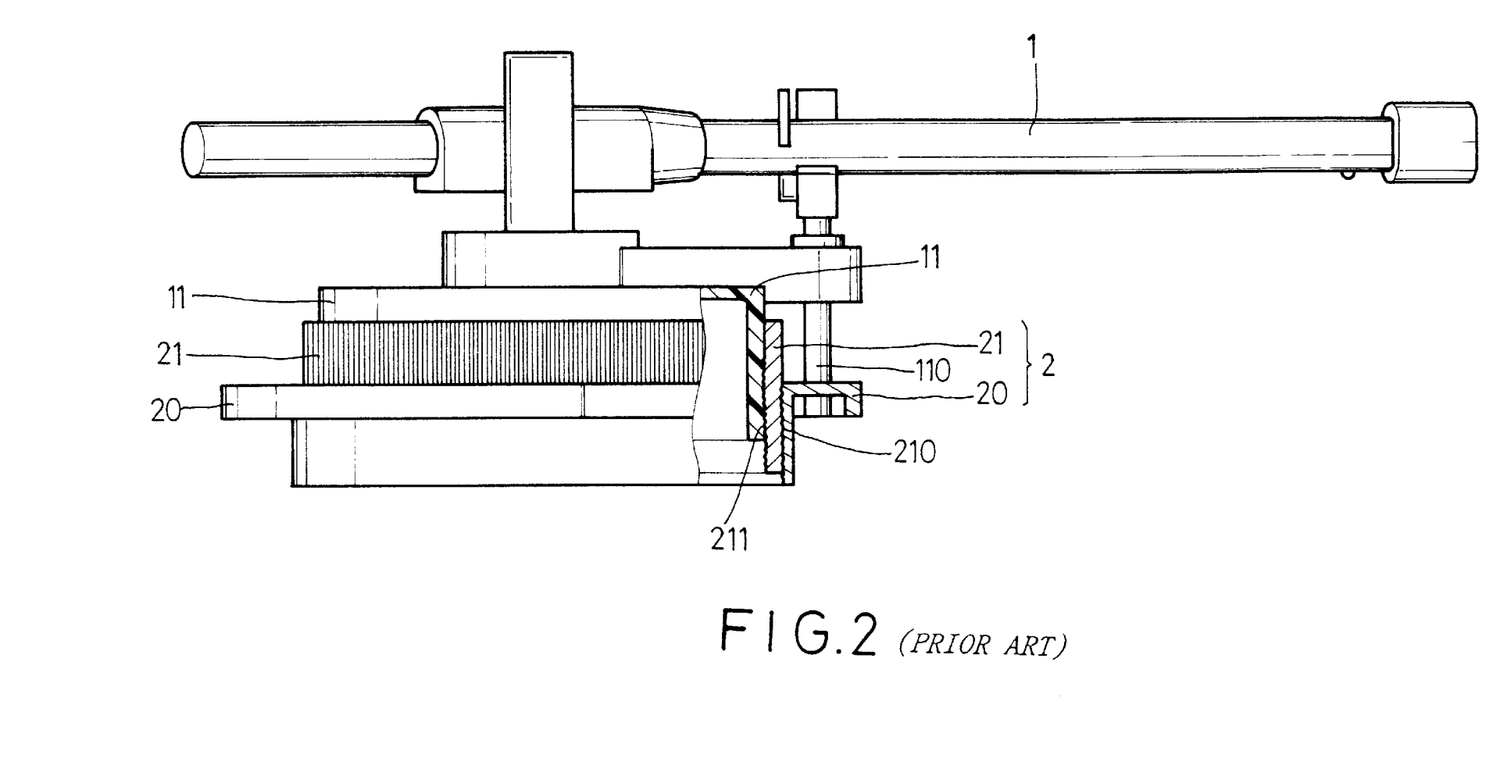
FIG. 2 is a partial cross-sectional view of the conventional height adjusting device for a tone arm.

A known conventional record player shown in FIG. 1, includes a tone arm 1, a cartridge (not shown in Figures) is connected to a front end of the tone arm 1, a seat 11 on which a rear end of the tone arm 1 is fixed tightly. A height adjusting device 2 for a tone arm is located under the seat 11, including an outer annular base 20, and an inner annular base 21 threadably engaging an inner wall of the outer annular base 20, as shown in FIG. 2.

The inner annular base 21 has an outer vertical wall 210 provided with threads engaging an inner vertical wall of the outer annular base 20, so that the inner annular base 21 may move up and down relative to the outer annular base 20. Further, the inner annular base 21 has an inner vertical wall 211 threadably engages an outer vertical wall of the seat 11. A vertical rod 110 110 is fixed with the seat 1 at an upper end and also fixed with an annular flat portion of the outer annular base 20, keeping the seat 11 from rotating, but possible to move up and down when the inner annular base 21 is rotated to the left or to the right. Thus, the tone arm 1 fixed tightly on the seat 11 may be lifted up or lowered down if the inner annular base 21 is rotated.

As just described above, the height adjusting device 2 for the tone arm 1 effects its purpose by rotating the inner annular base 21 relative to the seat 11 and the outer annular base 20, and one round rotation of the inner annular base 21 may let the tone arm 1 lifted up only one thread notch. So adjusting speed is very slow, inconvenient to handle in adjusting the height of the tone arm 1. Further, the height adjusting device 2 is not easy to produce, as the outer annular base 20, the inner annular base 21 and the seat 11 are all cut with threads, which are troublesome to form, resulting in high cost and much time necessary in producing.

SUMMARY OF THE INVENTION

This invention has been devised to offer a height adjusting device for a tone arm easy to handle, and easy to make as well.

BRIEF DESCRIPTION OF DRAWINGS

This invention will be better understood by referring to the accompanying drawings, wherein.

DETAILED DESCRIPTION OF THE PREFERRED EMBODIMENT

Figure 3:
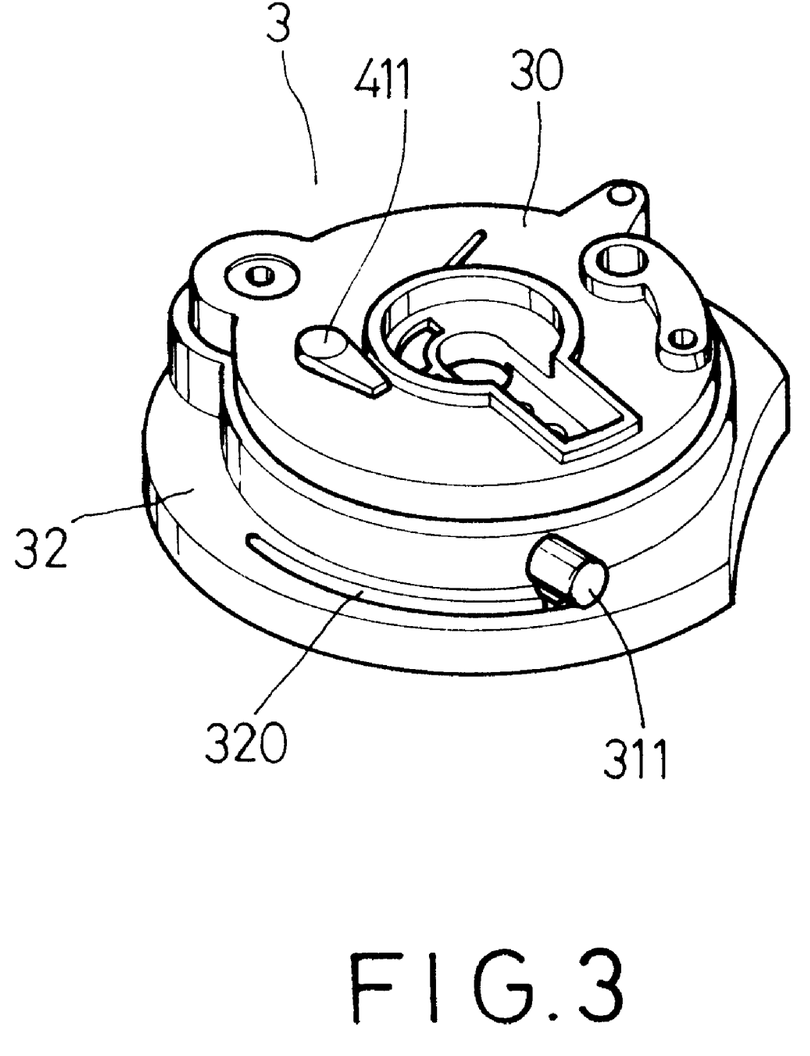
FIG. 3 is a perspective view of a height adjusting device for a tone arm in the present invention.
Figure 4:
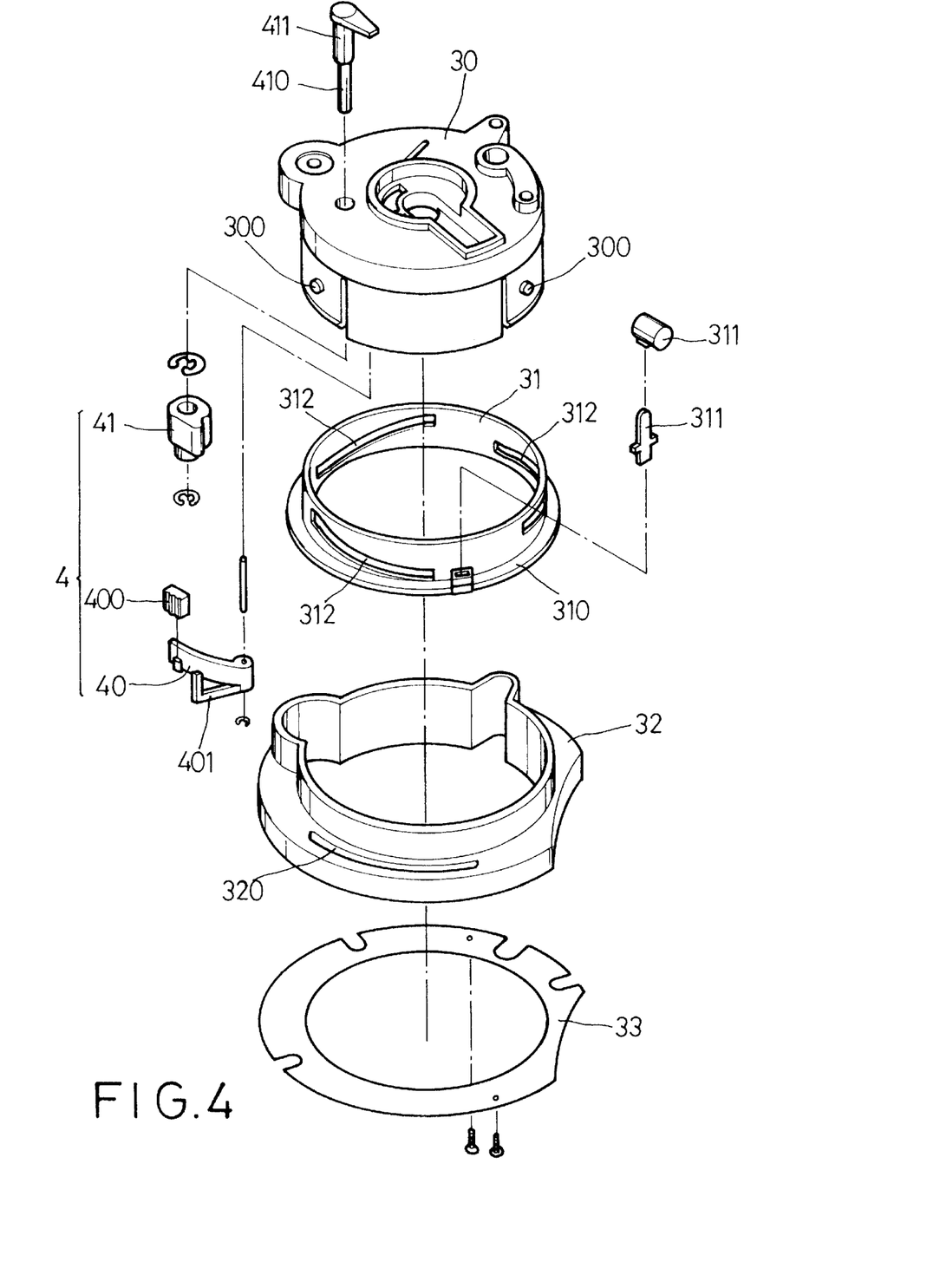
FIG. 4 is an exploded perspective view of the height adjusting device for a tone arm in the present invention.

A preferred embodiment of a height adjusting device for a tone arm 3 in the present invention, as shown in FIGS. 3 and 4, includes a seat 30 for fixing a tone arm (not shown in Figures) on an upper surface, an inner annular base 31 fixed at an outer side of the seat 30 as shown in FIG. 4, and an outer annular base 32 located under the seat 30 as shown in FIG. 4.

The outer annular base 32 is fixed immovable under the seat 30, having a center hollow space for the inner annular base 31 to fit therein, and a long curved slot 320 formed in an annular flat surface.

Figure 5:
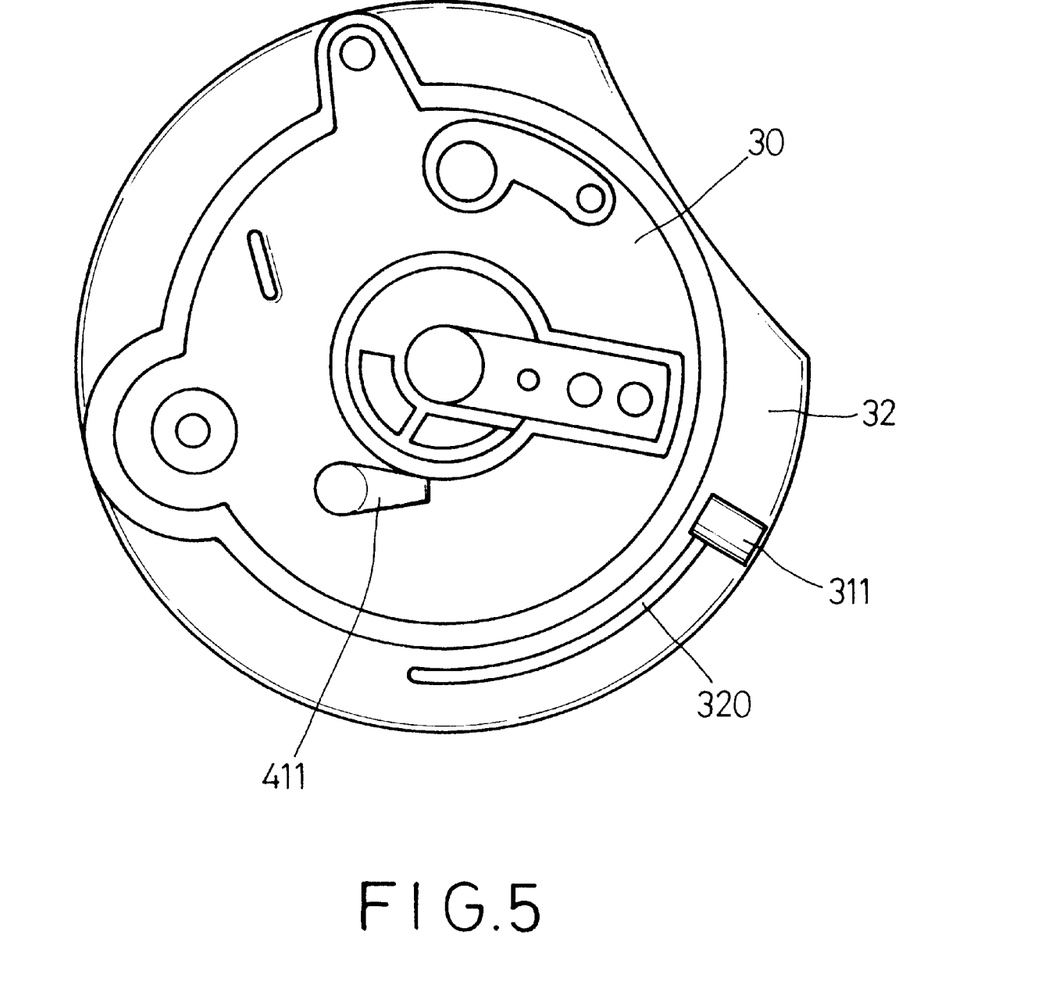
FIG. 5 is an upper view of the height adjusting device for a tone arm in the present invention.
Figure 6:
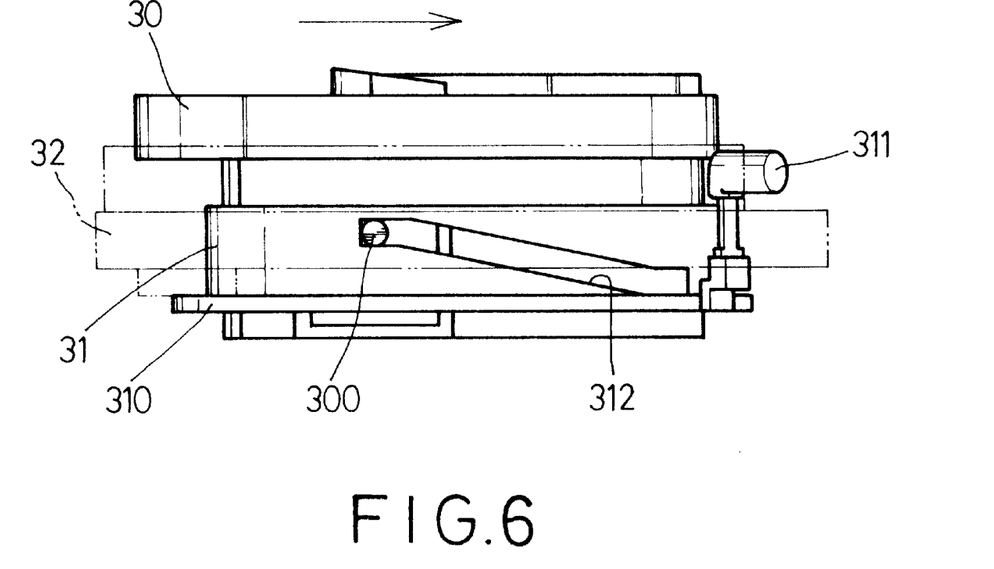
FIG. 6 is a first cross-sectional view of the height adjusting device for a tone arm being in adjusting process in the present invention.

The inner annular base 31 is also formed with a center hollow space, located inside the outer annular base 32, possible to rotate to the left or to the right relative to the outer annular base 32, but impossible to move up or down relative to the outer annular base 32. The inner annular base 31 has an annular connect lip 310 formed to extend horizontally and outward so as to contact the bottom of the outer annular base 32, as shown in FIG. 6. Further, an annular thin plate 33 is provided pinched between the lip 310 and the bottom of the outer annular base 32, permitting the inner annular base 31 31 only rotate, not move up or down. Further, a connector 311 is fixed with the inner annular vase 31, put through the slot 320 and located on the outer annular base 32, as shown in FIG. 5, for a user to pull and rotate the connector 311 together with the inner annular base 31 to the left or to the right. Further, the inner annular base 31 has some sloped slots 312 (three illustrated in this embodiment) spaced apart in the vertical wall, and the sloped slots 312 slope in the same direction, as shown in FIG. 6.

Figure 7:
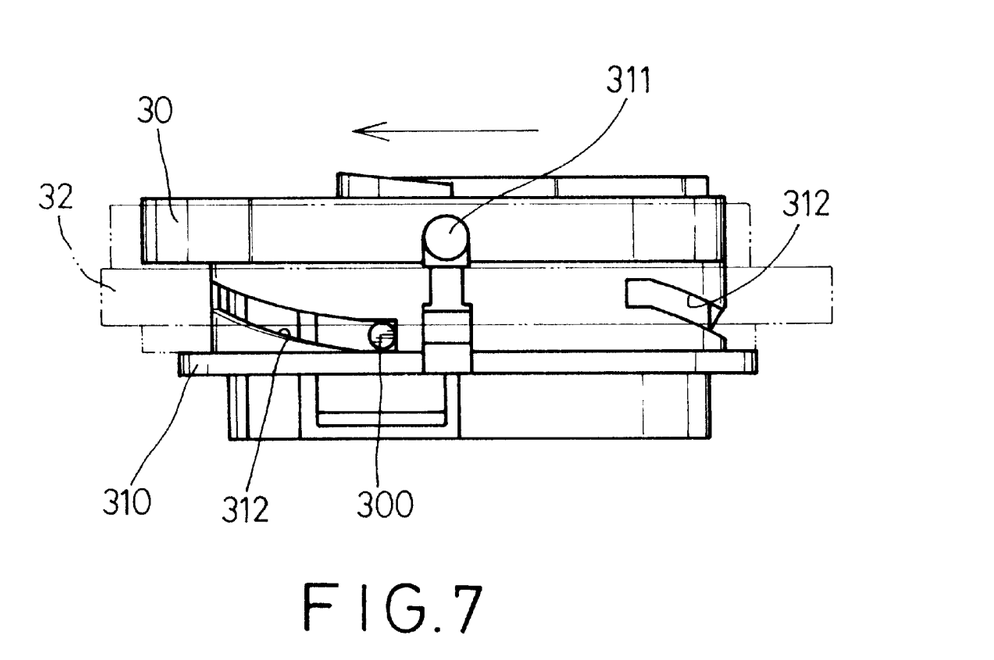
FIG. 7 is a second cross-sectional view of the height adjusting device for a tone arm being in adjusting process in the present invention.

The seat 30 with the tone arm is fitted in the inner annular base 31, having the same number of projections 300 as the sloped slots 312 on an outer vertical wall to respectively fit in the sloped slots 312, as shown in FIG. 6. Each projection 300 has a cut in two sides to let it provided with some elasticity. Consequently, the seat 30 will be lifted up or lowered down if the inner annular base 31 is rotated to the left or to the right relative to the outer annular base 32, as the projections 300 are moved up or down by the sloped slots 312. Thus the connector 311 can move up the seat 30 in case of the connector 311 pulled to the right, as as shown in FIG. 6, and move down the seat 30 in case of the connector 311 pulled to the left, as shown in FIG. 7.

It is evident that the seat 30 with the tone arm is lifted up or lowered down by movement of the sloped slots 312 of the inner annular base 31, so to adjust the height of the tome arm does not need a complete round of the inner annular base 31, but only needs a quarter or a third of one round for the tone arm to be lifted up enough, very faster than the conventional height adjusting device only possible to lift it up for a thread notch by one round. Further the seat 30, the inner annular base 31 and the outer annular base 32 all needs no threads, easier to make and lower in cost.

Figure 8:
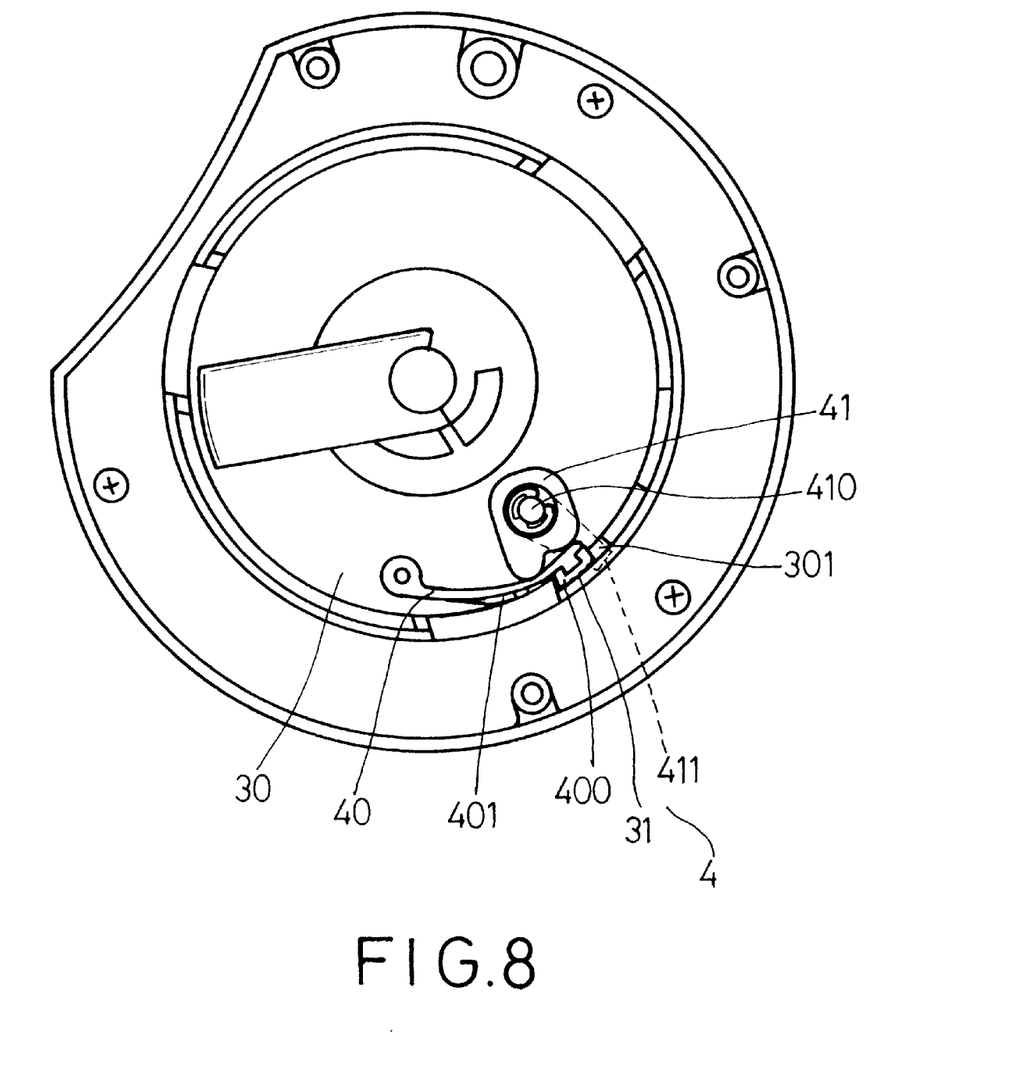
FIG. 8 is a third cross-sectional view of the height adjusting device for a tone arm being in adjusting process in the present invention; and, FIG. 9 is a fourth cross-sectional view of the height adjusting device for a tone arm being in adjusting process in the present invention.
Figure 9:
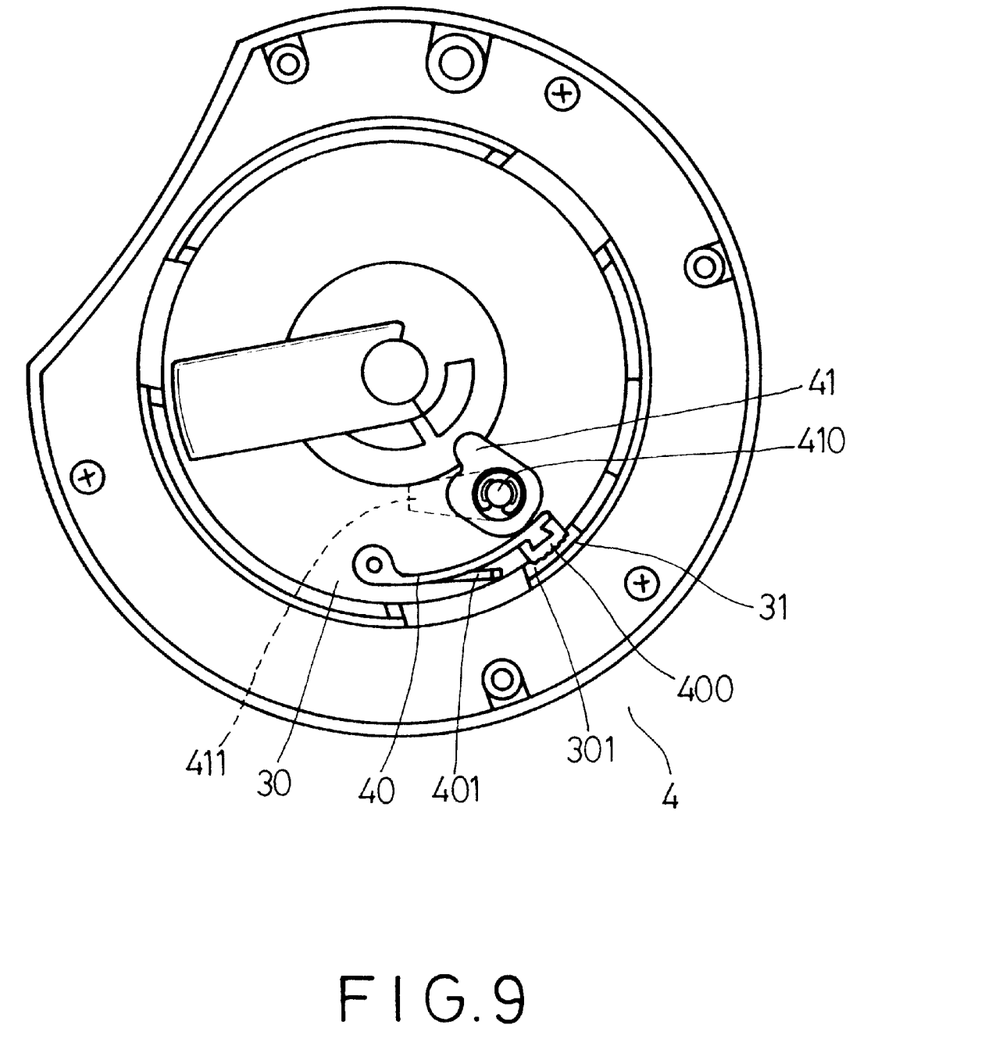

Next, in order to lock the tome arm in its position after it is adjusted in its height, a locking device 4 is added to the height adjusting device 3, mainly used to hamper the seat 30 together with the tone arm from moving, as shown in FIGS. 8 and 9.

The locking device 4 includes a stabilizing arm 40, and a eccentric cam 41 combined inside the seat 30.

The stabilizing arm 40 has a first end pivotally connected to an upper surface of the seat 30, a second end fixed with a locking member 400 located in a notch 301 provided in an inner wall of the seat 30. The notch 301 communicates with the inner wall of the inner annular base 31, permitting the locking member 400 contacts the inner wall of the inner annular base 31 in case the locking member 400 is pushed outward, as shown in FIG. 8. Further, the stabilizing arm 40 has an elastic member 401 extending from the arm 40 to contact the inner wall of the seat 30, giving the stabilizing arm 40 and the locking member 400 elasticity of biasing to the inner side of the seat 30.

The eccentric cam 41, as shown in FIGS. 4, 8 and 9, is pivotally connected in the seat 30 behind the locking member 400 with a pivot 410, having an activating member 411 fixed on an upper end protruding out of the upper surface of the seat 30, as shown with a dotted line in FIG. 8 so as to let a user rotate the cam 41. When the projection of the cam 41 contact the stabilizing arm 40, the locking member 400 may be pushed to move in the notch 301 of the seat 30 and press the inner wall of the inner annular base 31 (as shown in FIG. 8), with the elastic member 401 being pressed so that the inner annular base 31 can no longer be rotated. Then the seat 30 and the tone arm is no more movable up or down, locked in the position after adjusted. In case that the activating member 411 is pushed to let the cam 41 leave the stabilizing arm 40, the stabilizing arm 40 and the locking member 400 are moved back to their original position by resilience of the elastic member 401 without pressing the inner wall of the inner annular base 31, as shown in FIG. 9. Then a user can rotate the inner annular base 31 for adjusting the height of the tone arm.

A substitute way of controlling rotation of the inner annular base 31 may be a section of teeth formed on an outer surface of the base 31 instead of the connector 311, and a gear provided to engage the teeth for rotating the inner annular base 31 manually or with a motor.

While the preferred embodiment of the invention has been described above, it will be recognized and understood that various modifications may be made therein and the appended claims are intended to cover all such modifications which may fall within the spirit and scope of the invention.

I claim:

1. A height adjusting device for a tone arm of a record player comprising:

an outer annular base provided stationary and having a center hollow space;

an inner annular base fitted in said outer annular base, rotatable to the left or to the right relative to said outer annular base, and impossible to move up or down;

a seat having its bottom fitted in said inner annular base, said tone arm is fixed on an upper surface of said seat; wherein said inner annular base is provided with sloped slots spaced apart in its vertical wall, said sloped slots sloping in the same direction, said seat having projections spaced apart on its vertical wall to respectively fit in said sloped slots of said inner annular base, said rotation of said inner annular base moving said seat up and down together with said tone arm by engagement of said projections with said sloped slots, thereby facilitating handling of said height adjusting device.

2. The height adjusting device for a tone arm as claimed in claim 1, wherein further a locking device is provided inside said seat, for locking the position of said tone arm after adjusted in its height, said locking device comprising:

a stabilizing arm fixed inside said seat, having a first end pivotally fixed and a second end fixed with a locking member facing said inner annular base, said seat having a notch facing said locking member and communicating with said inner annular base, said stabilizing arm having an elastic member extending to an inner wall of said seat, said elastic member having its outer end contacting an inner wall of said seat; and, an eccentric cam provided to be connected pivotally behind said locking member, said cam possible to be moved to push said locking member move in said notch of said seat and press an inner wall of said inner annular base to lock said inner annular base immovable so as to lock said tone arm after adjusted in its height.

3. The height adjusting device for a tone arm as claimed in claim 1, wherein said outer annular base is provided with a long horizontal slot in an annular flat surface, and said inner annular base has a connector that projects through said long horizontal slot of said outer annular base so that said inner annular base is rotated manually by gripping and pushing said connector.

4. The height adjusting device for a tone arm as claimed in claim 1, wherein said inner annular base is provided with a section of teeth on an outer vertical surface, and a gear provided to engage said teeth so that said gear is manually or by a motor rotated to rotate said inner annular base.

5. The height adjusting device for a tone arm as claimed in claim 1, wherein three of said sloped slots are provided spaced apart in said inner annular base.

6. The height adjusting device for a tone arm as claimed in claim 1, wherein said projections of said seat respectively has a cut in two sides so as to elastically fit in said sloped slots of said inner annular base.

* * * * *